US012264719B2

(12) United States Patent
Skorski et al.

(10) Patent No.: US 12,264,719 B2
(45) Date of Patent: Apr. 1, 2025

(54) ELECTROMAGNETIC BRAKE

(71) Applicant: Konecranes Global Corporation, Hyvinkää (FI)

(72) Inventors: Richard Skorski, Uslar (DE); Harald Engel, Uslar (DE); Thomas Kröpke, Wetter (DE)

(73) Assignee: Konecranes Global Corporation, Hyvinkää (FI)

( * ) Notice: Subject to any disclaimer, the term of this patent is extended or adjusted under 35 U.S.C. 154(b) by 471 days.

(21) Appl. No.: 17/597,749

(22) PCT Filed: Jul. 20, 2020

(86) PCT No.: PCT/EP2020/070399
§ 371 (c)(1),
(2) Date: Jan. 21, 2022

(87) PCT Pub. No.: WO2021/013776
PCT Pub. Date: Jan. 28, 2021

(65) Prior Publication Data
US 2022/0260124 A1   Aug. 18, 2022

(30) Foreign Application Priority Data

Jul. 24, 2019   (DE) .................... 10 2019 120 041.5

(51) Int. Cl.
| F16D 65/18 | (2006.01) |
| F16D 59/02 | (2006.01) |
| F16D 55/00 | (2006.01) |
| F16D 121/22 | (2012.01) |

(52) U.S. Cl.
CPC .......... F16D 65/186 (2013.01); F16D 59/02 (2013.01); *F16D 2055/0058* (2013.01); *F16D 2121/22* (2013.01); *F16D 2250/0084* (2013.01)

(58) Field of Classification Search
CPC .............................................. F16D 2250/0084
See application file for complete search history.

(56) References Cited

U.S. PATENT DOCUMENTS

| 5,685,398 A | 11/1997 | Marshall et al. |
| 2015/0292579 A1* | 10/2015 | Walther ................ F16D 65/123 |
| | | 188/58 |

FOREIGN PATENT DOCUMENTS

| CN | 101523075 A | 9/2009 |
| CN | 102770684 A | 11/2012 |
| CN | 105970896 A * | 9/2016 ......... E02B 17/0818 |
| CN | 207759963 U | 8/2018 |
| CN | 207762156 U | 8/2018 |
| DE | 2832523 A1 | 2/1980 |

(Continued)

OTHER PUBLICATIONS

Preliminary Report on Patentability of the International Searching Authority in English from corresponding Patent Cooperation Treaty (PCT) Application No. PCT/EP2020/070399, completed Jun. 8, 2021.

*Primary Examiner* — Melody M Burch
(74) *Attorney, Agent, or Firm* — Gardner, Linn, Burkhart & Ondersma LLP

(57) ABSTRACT

An electromagnetic brake having a housing body, a friction disk, and at least one compression spring provided in the housing body, wherein the friction disk has a bayonet-type connection to the housing body, wherein the friction disk is secured against rotation relative to the housing body.

13 Claims, 14 Drawing Sheets

(56) References Cited

FOREIGN PATENT DOCUMENTS

Figure 1:
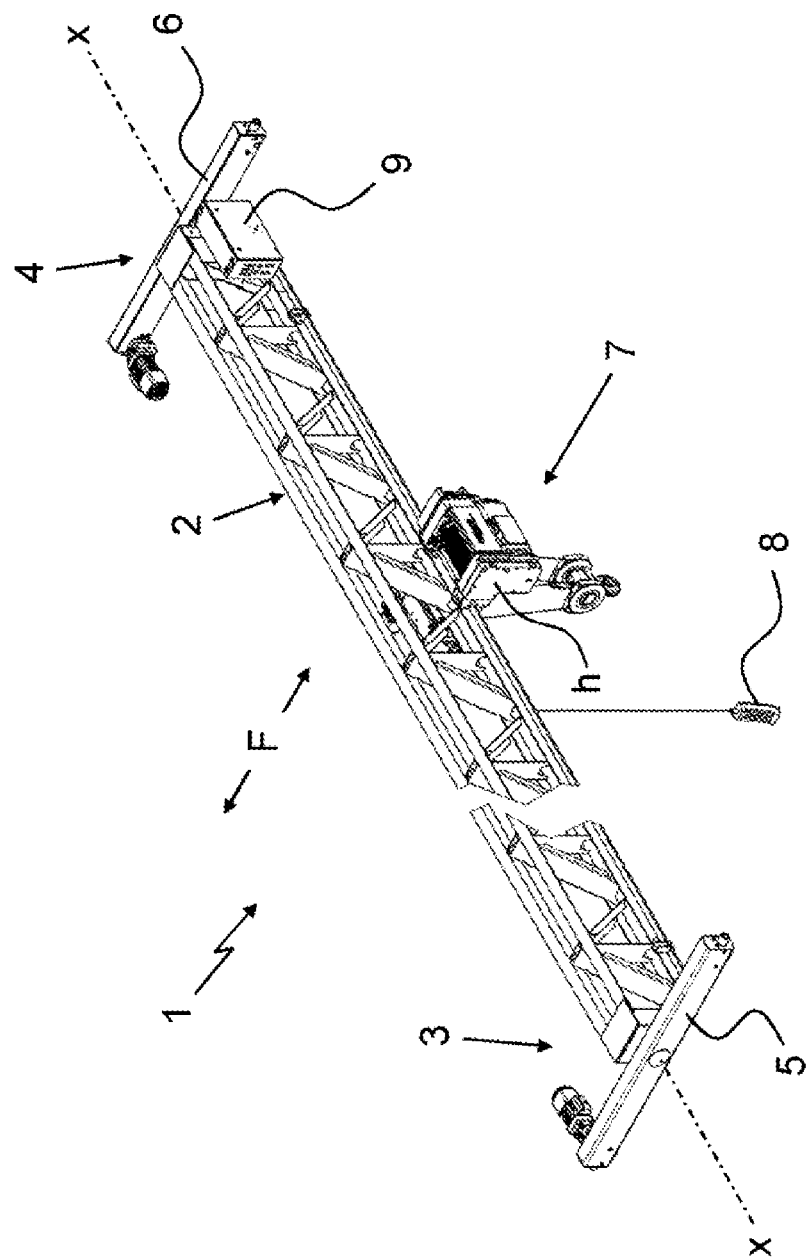

| | | |
|---|---|---|
| DE | 28 32 723 C2 | 5/1990 |
| DE | 41 09 786 A1 | 10/1991 |
| DE | 100 49 168 C2 | 12/2003 |
| DE | 202012000897 U1 | 2/2012 |
| DE | 10 2012 001 701 B3 | 3/2013 |
| DE | 102014000196 A1 * | 9/2014 ............. F16D 55/28 |
| DE | 10 2014 001 474 B4 | 5/2016 |
| DE | 102015001647 A1 * | 8/2016 |
| DE | 102017000845 A1 | 8/2018 |
| DE | 102018006725 A1 * | 3/2019 |
| JP | H05256330 A | 10/1993 |
| KR | 101299558 B1 | 8/2013 |
| WO | 2018141480 A1 | 8/2018 |

\* cited by examiner

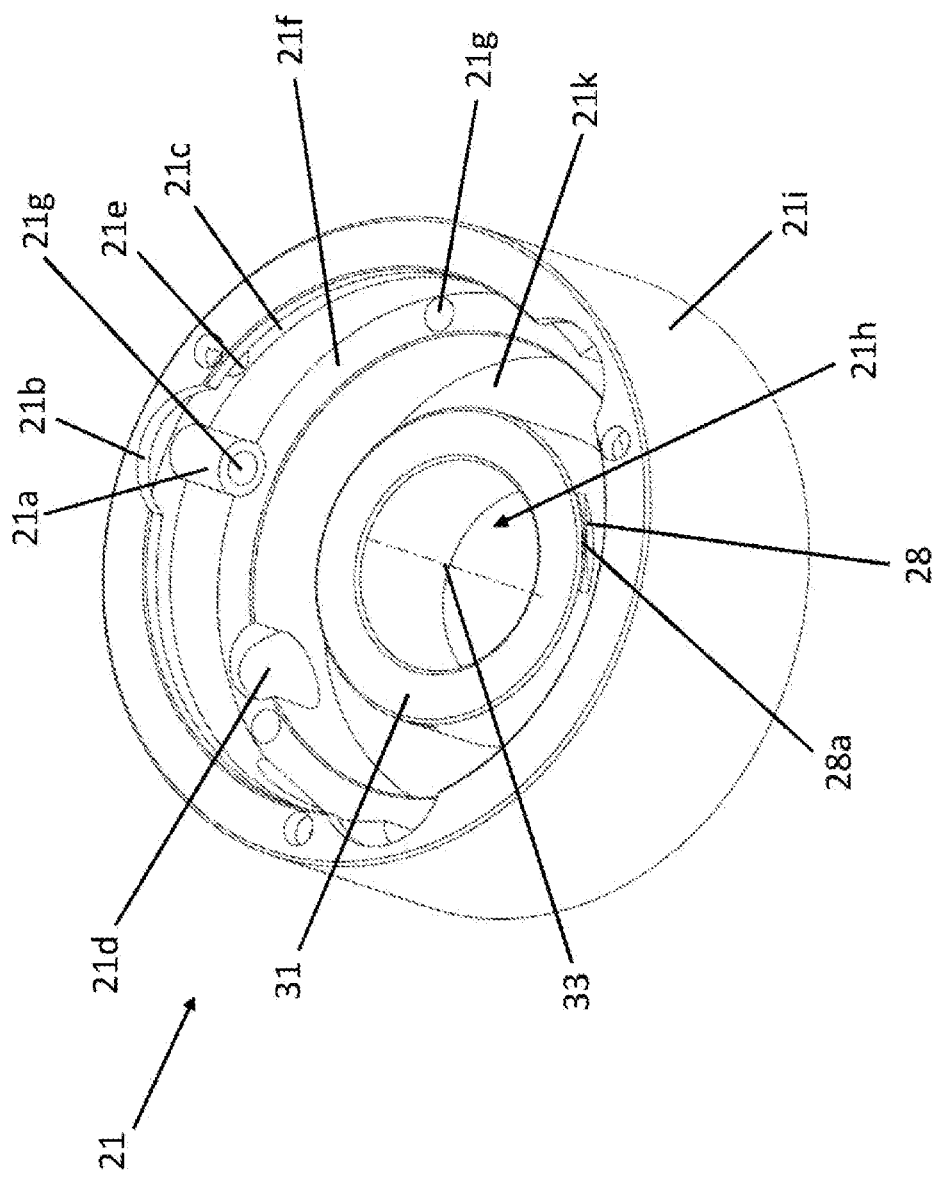

ELECTROMAGNETIC BRAKE

The invention relates to an electromagnetic brake according to the preamble of claim 1. Further, the invention relates to a method for assembling such an electromagnetic brake according to the preamble of claim 7.

Such an electromagnetic brake is known from DE 10 2017 000 845 A1.

Also known from DE 10 2012 001 701 B3 is an electromagnetic brake in which the friction disk is positively connected to the magnet housing of the brake.

DE 41 09 786 A1 discloses an electromagnetic brake, the friction disk of which is formed by the base of a cover of the brake. The cover, in which a spring element of the brake is also arranged, has a bayonet-type connection to a motor housing.

Further electromagnetic brakes are known from DE 10 2014 001 474 B4, DE 100 49 168 C2, or DE 28 32 723 C2. The electromagnetic brake described in each case is mounted using positive connections and used, for example, in a robot or an elevator.

Further brakes are known from DE 20 2012 000 897 U1, KR 101 299 558 B1, JP H05 256 330 A, DE 28 32 523 A1, and U.S. Pat. No. 5,685,398 A.

Proceeding from this prior art, the aim of the present invention is to create an improved electromagnetic brake which can be mounted in a particularly simple manner.

This aim is achieved by an electromagnetic brake having the features of claim 1 and a method according to the features of claim 7. Advantageous embodiments of the invention are specified in the dependent claims and the following description.

According to the invention, an improved electromagnetic brake, having a housing body, a friction disk, and at least one compression spring arranged in the housing body, wherein the friction disk has a bayonet-type connection to the housing body of the electromagnetic brake, wherein such a bayonet-type connection is also referred to as a bayonet lock, is created in that the friction disk—in particular, during operation of the electromagnetic brake—is secured against rotation relative to the housing body.

After the bayonet-type connection has been produced, the friction disk is, advantageously, prevented from being able to rotate such that the connection between the friction disk and the housing body is at risk of disconnecting. A correspondingly designed contour is, preferably, provided in the friction disk for such an anti-rotation means, with which a locking element is then brought into engagement. The anti-rotation means can thus be produced by positive locking between the friction disk and the locking element.

In other words, geometries corresponding to each other are provided on the housing body and on the friction disk, said geometries being designed and configured such that the housing body and the friction disk can have a bayonet-type and thus positive connection to one another by means of said geometries. A connection of this kind can arise, in particular, in that the housing body and the friction disk are initially plugged, set, placed, put, or pushed into one another and thus brought into engagement with one another.

Preferred embodiments of the bayonet-type connection, also referred to as a bayonet lock, are described in detail below.

The friction disk is designed as a substantially circular and preferably annular disk and has on its circumference at least one outwardly-directed lug, by means of which the friction disk is mounted in the housing body in a positive and bayonet-type manner. At least two lugs are required in order to be able to prevent the friction disk from lifting out of the housing body. Preferably, the friction disk comprises three lugs, which are each arranged at an angle of 120° on the circumference of the friction disk. The friction disk is therefore preferably rotationally symmetrical, so that the lugs are distributed uniformly on the circumference of the friction disk. A different number of lugs is, of course, also conceivable. The material of the friction disk is selected such that its stiffness is sufficient for the forces occurring during one or more braking(s) and its temperature resistance sufficient for the temperatures occurring during one or more braking(s).

The housing body has a substantially hollow-cylindrical and annular shape, with an opening on its front face and a base opposite the front face. In the region of the front face, the housing body has at least one recess with a receiving groove adjoining thereto. The recess is therefore arranged on a web, formed by the casing wall of the housing body and delimiting the receiving groove, on the front face of the housing body. The housing body has, for each lug of the friction disk, one such recess with, in each case, a receiving groove adjoining thereto, i.e., preferably three. A different number of recesses with receiving grooves adjoining thereto is, of course, also conceivable. The recesses are in each case introduced into the housing body at positions corresponding to the lugs. The recesses enable the friction disk or its lugs to be inserted into the receiving grooves and thus to produce the bayonet-type connection between the housing body and the friction disk. The receiving grooves preferably extend in sections circumferentially and spaced apart from one another in the casing wall of the housing body. Such an arrangement in sections of the receiving grooves has the advantage that the end-mounted position of the friction disk in the housing body can be predetermined in a simple manner by the end of the receiving groove, which faces away from the recess and is, in particular, closed, and thus subsequent assembly steps can be simplified. As a result of their closed ends, the receiving grooves thus each define a bayonet seat, which facilitates the finding of the end-mounted position during assembly. Instead of several separate receiving grooves for the lugs of the friction disk, a single receiving groove extending over the entire circumference can, alternatively, also be provided. The housing body is preferably formed in one piece. The material of the housing body is selected such that its stiffness is sufficient for the forces occurring during one or more braking(s) and its temperature resistance sufficient for the temperatures occurring during one or more braking(s). In addition, the material of the housing body is preferably magnetic.

For the production of the bayonet-type connection, the lugs of the friction disk are thus first guided through the recesses of the housing body. The contour of the lugs of the friction disk and the contour of the recesses in the housing body are coordinated with one another in such a way that the lugs fit through the recesses in the installed position with sufficient play. In a second step, the lugs of the friction disk are guided from the recess into the receiving grooves of the housing body and are displaced in the direction of rotation for this purpose. In this case, the friction disk and the housing body are, in a manner typical for a bayonet lock, rotated relative to one another. The material thickness of the lugs and the width of the receiving grooves are coordinated with one another in such a way that the lugs can be moved with sufficient play within the receiving groove in the direction of rotation.

In the embodiments described above, the anti-rotation means also prevents the friction disk, after its positioning in the receiving groove, from rotating out of the latter in the direction of the adjacent recesses, such that, when the lugs and recesses are congruent, there is a risk of the connection between the friction disk and the housing body disconnecting. The contour provided for the anti-rotation means in the friction disk is preferably embodied in at least one of its lugs.

Further elements are not required for the production of the connection or of the anti-rotation means between the friction disk and the housing body. In contrast to the prior art, in which the connection between the friction disk and the housing body or between the friction disk and other elements of the electromagnetic brake takes place in a non-positive manner—in particular, by means of screws—the assembly can thus be simplified in the electromagnetic brake according to the invention in such a way that the electromagnetic brake can be mounted more easily in a partially-automated or fully-automated manner. These advantages also ensue with respect to an integral connection. This enables simple assembly in a manufacturing operation designed in the sense of Industry 4.0—in particular, with the aid of robots.

Despite the bayonet-type and thus purely positive connection, which is produced during the mounting of the electromagnetic brake, as well as anti-rotation means between the housing body and the friction disk, during operation, the friction disk is pulled or pressed by the forces acting thereby against one of the edges or webs delimiting the receiving groove of the housing body. Vibrations on the friction disk and thus noise generation during the operation of the electromagnetic brake can thus be reduced or even avoided.

According to the invention, the friction disk is secured against rotation relative to the housing body by means of at least one locking element, and the locking element is a connecting element which is used for the attachment of the electromagnetic brake to a component—for example, for flange mounting on a motor or a cable drum. The locking element may, for example, be a pin or a screw which then engages in the contour in the friction disk and thereby forms the positive anti-rotation means.

The locking element is preferably guided through a hole in the housing body and a recess forming the contour in one of the lugs of the friction disk. Neither the hole in the housing body nor the recess in the lug of the friction disk has a thread, so that a purely positive connection is produced between the locking element and the friction disk, and between the locking element and the housing body, even when a screw is used.

Depending upon the intended operating load of the electromagnetic brake, it may be necessary for several locking elements to be used. A corresponding lug with a recess on the friction disk is preferably provided for each locking element. However, if the number of locking elements is less than the number of lugs, it is conceivable that a corresponding contour or recess not be provided on each lug.

If, optionally, more connecting elements are required to attach the electromagnetic brake to a component than to secure the friction disk against rotation, the other connecting elements can be guided through the electromagnetic brake or fastened to the electromagnetic brake at other positions which are independent of the friction disk or their lugs.

Apart from the housing body and the friction disk, the electromagnetic brake preferably comprises a coil unit, a pole core, which is arranged within the coil unit and can be excited thereby, at least one compression spring, an armature disk, and a brake disk. The coil unit, the pole core, the compression spring(s), the armature disk, and the brake disk are preferably arranged, like the friction disk, in the housing body. Preferably, the coil unit, the armature disk, the brake disk, and the friction disk, or at least individual ones thereof, are introduced into the housing body via the opening on the front face and connected to said housing body during assembly. This preferably also applies to the compression spring(s). The pole core may be a component of the housing body.

The materials of the pole core, the armature disk, and the brake disk are selected such that their stiffness is sufficient for the forces occurring during one or more braking(s) and their temperature resistance sufficient for the temperatures occurring during one or more braking(s). The pole core is also made of a magnetic material so that it can be excited by the coil unit.

The brake disk is preferably arranged between the axially-displaceable armature disk and the friction disk and is configured to be rotatable and axially displaceable. The at least one compression spring is arranged and configured such that, as a result of its compressive force, the armature disk is axially displaceable towards the brake disk. By contrast, the coil unit and the pole core are arranged and configured such that a tensile force can be generated by the pole core which is electromagnetically excited by means of the coil unit, by means of which tensile force the armature disk is axially displaceable away from the brake disk.

The brake disk can be connected to a shaft—in particular, a drive shaft, and, in particular, an output shaft—of a motor. In this case, it may be necessary for the housing body, the coil unit, the pole core, the compression spring, the armature disk, and the friction disk, or at least individual ones thereof, to be formed in a ring-shaped manner, in that they each have a hole or an opening so that the shaft can be guided therethrough.

In a first operating state of the electromagnetic brake—the braking—the armature disk presses the brake disk against the friction disk by means of the compressive force of the at least one compression spring in order to brake the brake disk by means of the braking torque arising between the brake disk and the friction disk and/or between the brake disk and the armature disk. The friction disk and/or the armature disk preferably has/have a suitably structured surface on its/their side facing the brake disk, respectively, in order to ensure an optimal deceleration of the brake disk during braking. During braking, the friction disk, by means of the pressure force generated by the at least one compression spring, is pressed via the armature disk and the brake disk onto the outer web of the casing wall, delimiting the receiving groove, of the housing body.

In a second operating state of the electromagnetic brake—the release—the armature disk is arranged at a distance from the brake disk by means of a tensile force, generated by the coil unit and the pole core, which is greater than the compressive force of the at least one compression spring, such that a free and thus unbraked rotation of the brake disk is made possible. During the release, the friction disk is pulled onto the inner web of the receiving groove by means of the magnetic field, generated by the coil unit and the pole core, or of the resulting tensile force.

In an advantageous embodiment, it is provided that the armature disk be guided axially in the housing body via a groove-lug connection, wherein at least one guide groove—preferably three guide grooves—and at least one associated guide lug—preferably three associated guide lugs—are provided. In addition to the axial guidance, the guide groove of the groove-lug connection also has the function of restricting the rotatability of the armature disk in the peripheral direction, such that the rotatability is permitted only within the scope of the play required for the axial movements. The respective guide groove is preferably arranged in the housing body and, in particular, is formed in its casing wall. The casing wall is closed to the outside in the region of the groove-lug connection and thus, in particular, in the region of the guide groove, since the guide groove does not constitute a continuous hole of the casing wall, but rather a depression in the casing wall of the housing body. A continuous hole which can be penetrated completely by the guide lug is, in this sense, not a guide groove. It is also conceivable for the guide groove—in particular, in the form of a recess—to be arranged in the armature disk and for a respectively corresponding, lug-shaped contour to be arranged in the housing body as a guide lug, wherein said contour is then preferably an integral component of the housing body and, in particular, formed in the casing wall thereof. In both aforementioned cases, the casing wall is closed outwardly in the region of the groove-lug connection. Better protection against environmental influences is achieved as a result. In addition, advantageously, no moving elements, such as the guide lug, protrude out of the housing body, so that undesired collisions with other components can be avoided.

In order to enable the armature disk to be guided in the housing body without tilting, three guide grooves and three guide lugs are preferably provided. The guide grooves and guide lugs are preferably distributed uniformly over the circumference of the housing body or the armature disk. The outer contour of the guide lugs is embodied in a form similar or preferably identical to the inner contour of the guide grooves, wherein sufficient play for an axial movement of the armature disk is provided between the outer contour of the guide lugs and the inner contour of the guide grooves.

The armature disk is preferably guided axially in the housing body exclusively via the aforementioned groove-lug connection. Further guide elements, such as guide bolts or guide sleeves, are not required for guiding the armature disk in the housing body. These can thus be omitted, and the outlay on construction and production can consequently be reduced. This would especially be true were the guide elements to, for example, be non-positively fastened to the housing body with screws. In contrast to the prior art, the assembly can thus be simplified in such a way that the electromagnetic brake can be mounted more easily in a partially-automated or fully-automated manner. These advantages also ensue with respect to an integral connection.

A coil unit is, advantageously, provided, which is connected to the housing body—preferably, exclusively—in a positive manner and/or which is secured against rotation relative to the housing body.

The coil unit preferably has a substantially annular geometry with an outwardly-open, C-shaped cross-section. The coil unit is designed as a coil carrier and is suitable for receiving one or more coils or for mounting them on itself or in itself.

Preferably, a positioning lug arranged on the coil unit engages in a corresponding, similarly-shaped—preferably, identically-shaped—receptacle on the housing body in order to secure the coil unit against rotation with respect to the housing body. However, it is also conceivable that a corresponding receptacle be arranged in the coil unit, and a positioning lug corresponding thereto be arranged on or in the housing body.

In contrast to the prior art, according to which, for example, the coil unit is integrally molded into the housing body by means of synthetic resin, the assembly can thus be simplified in the electromagnetic brake according to the invention in such a way that the electromagnetic brake can be mounted more easily in a partially-automated or fully-automated manner. These advantages also result with respect to a non-positive connection.

In a structurally simple manner, it is provided that the coil unit be connected to the housing body in a positive manner by means of a snap-fit connection, wherein preferably at least one snap hook of the coil unit is supported on a web of the housing body. The snap hook is in each case dimensioned and designed, in terms of material technology, in such a way that, when the coil unit is mounted in the housing body, it can be elastically deformed by applying a force such that the snap hook can latch into a groove provided on the housing body. In this case, the force acts, in particular, in parallel to a central axis of the housing body in the direction of the base of the housing body.

Due to its substantially annular geometry, the coil unit preferably has at least three snap hooks. A different number of snap hooks is of course also conceivable, wherein said number is preferably determined taking into account the forces that occur.

The snap hook or hooks may be an integral component of the coil unit. However, it is also conceivable for the snap hooks to be connected to separate components and to the coil unit.

It is also of particular advantage that the coil unit is mounted on the housing body in such a way that the coil unit is flexible at least in the region of its positive connection to the housing body and is thus axially movable relative thereto in order to simplify assembly. For this purpose, the coil unit may have a shoulder on its side facing the base of the housing body in order to achieve a flexibility of the coil unit at least outside the shoulder. Said shoulder is preferably arranged on a diameter of the substantially annular coil unit, which diameter is as far away as possible from the diameter of the coil unit on which the snap hooks are arranged. Outside of the shoulder, a space remains free between the coil unit and the base of the housing body, e.g., in the region of the inner diameter on which the snap hooks are arranged. This space can be used as a type of spring travel in order to be able to press the coil unit, due to its partial flexibility, axially in the direction of the housing body during mounting, so that the snap hooks can latch more easily into the groove of the housing body.

The mounting of the electromagnetic brake according to the invention, overall, does not require a positive or integral connection technology. It can be mounted exclusively via positive connections. In contrast to the prior art, the mounting of an electromagnetic brake according to the invention is thus easier to carry out. In particular, the mounting can be carried out in a simple manner in a partially-automated or fully-automated manner. This enables simple mounting in a manufacturing operation designed in the sense of Industry 4.0—in particular, with the aid of robots.

The invention is also directed towards a lifting gear, which comprises an electromagnetic brake according to the invention. In this application, the electromagnetic brake can be used, for example, for holding a load or for decelerating a drive of the lifting gear provided for raising and lowering a load. For this purpose, the brake disk of the electromagnetic brake is connected to a corresponding component of the lifting gear, i.e., a drive shaft of the lifting gear drive or lifting gear motor, or to a cable drum of the lifting gear. In this case, the assembly can be carried out with a housing body resting directly on the respective component—in particular, without the friction disk resting on the lifting gear drive or the cable drum and, in particular, without an air gap and seal between the housing body and the component.

The lifting gear can be installed, for example, in a crane or a stationary hoist, which mostly serve to raise and lower loads—in the case of cranes, in particular, at different locations from each other by moving the lifted loads horizontally within the working area of the crane.

According to the invention, a method for mounting an electromagnetic brake according to one of the previously described embodiments is established in that the friction disk is inserted into a recess in the housing body and, by a relative movement in the direction of rotation, is brought into engagement with the housing body by means of a receiving groove adjoined to the recess, wherein at least one lug—preferably three lugs—of the friction disk and the recess are no longer axially congruent after the relative movement, and the friction disk is subsequently secured against rotation relative to the housing body by means of at least one locking element, which is used as a connecting element for attaching the electromagnetic brake to a component.

In other words, the friction disk has a bayonet-type, and thus positive, connection to the housing body, in that the lug(s) of the friction disk are guided through the recesses into the receiving groove(s) adjoining thereto of the housing body and away from the recesses into the receiving groove (s). The friction disk is rotated thereby relative to the housing body at least enough that at least the contour of the lug and the corresponding negative contour in the recess are no longer axially congruent. Subsequently, the anti-rotation means is produced as already described above with respect to the electromagnetic brake, as a result of which the same advantages ensue.

In an advantageous embodiment, it is provided that an armature disk be inserted into the housing body in such a way that at least one guide lug of the armature disk is guided in an associated guide groove of the housing body. Preferably, the step of mounting the anchor disk in the housing body happens before the above step of mounting the friction disk takes place.

It can be provided, particularly advantageously, that a coil unit be inserted into the housing body in such a way that at least one positioning lug of the coil unit engages in a corresponding receptacle of the housing body to protect against rotation, and/or that the coil unit is connected axially in a positive manner to the housing body by means of a snap-fit connection. However, it is also conceivable that a corresponding receptacle be arranged in the coil unit and a positioning lug corresponding thereto be arranged on or in the housing body. Preferably, the step of mounting the coil unit in the housing body takes place before the above steps of mounting the armature disk and, finally, the friction disk take place.

Figure 2:
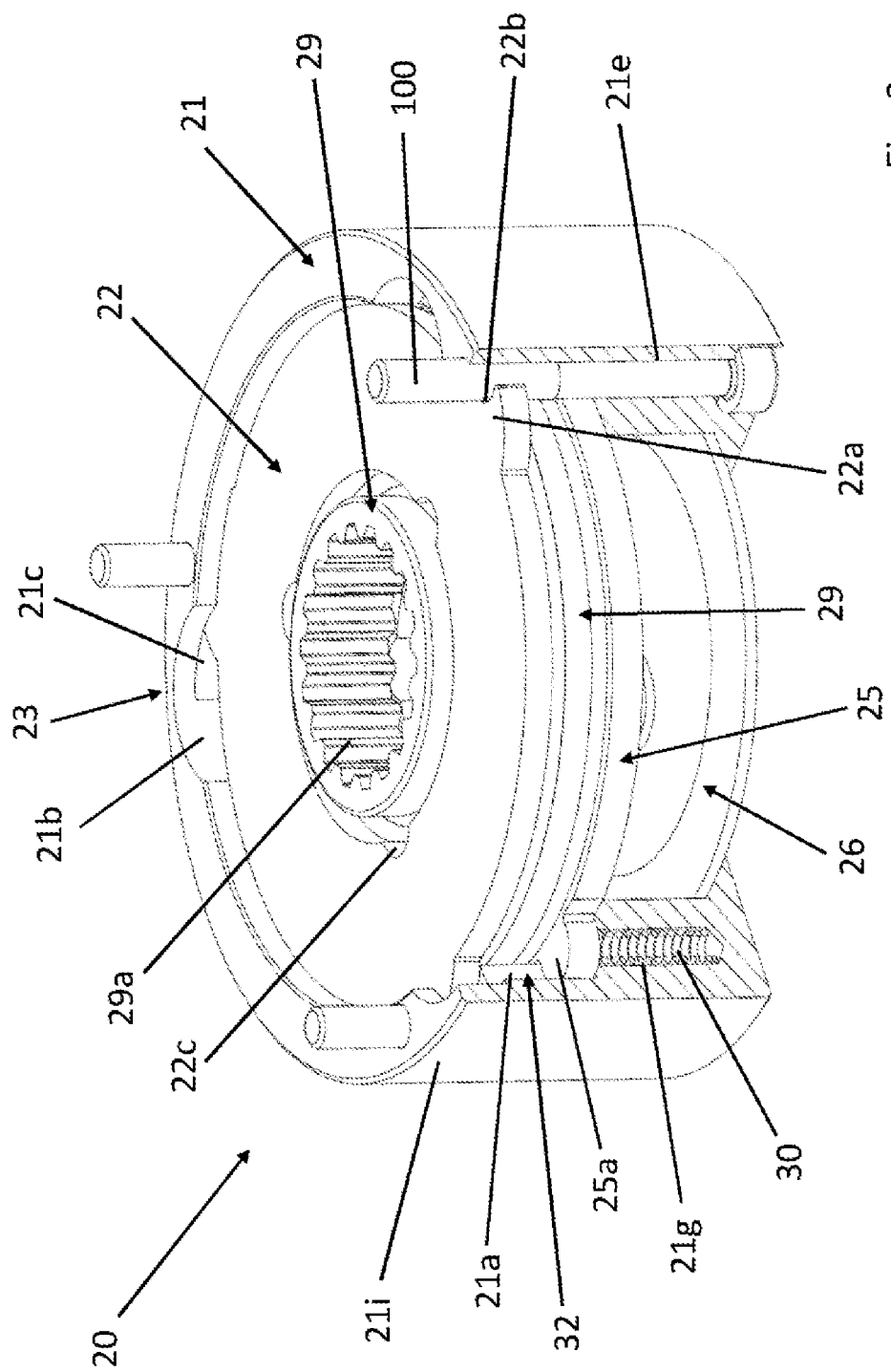
Figure 3:
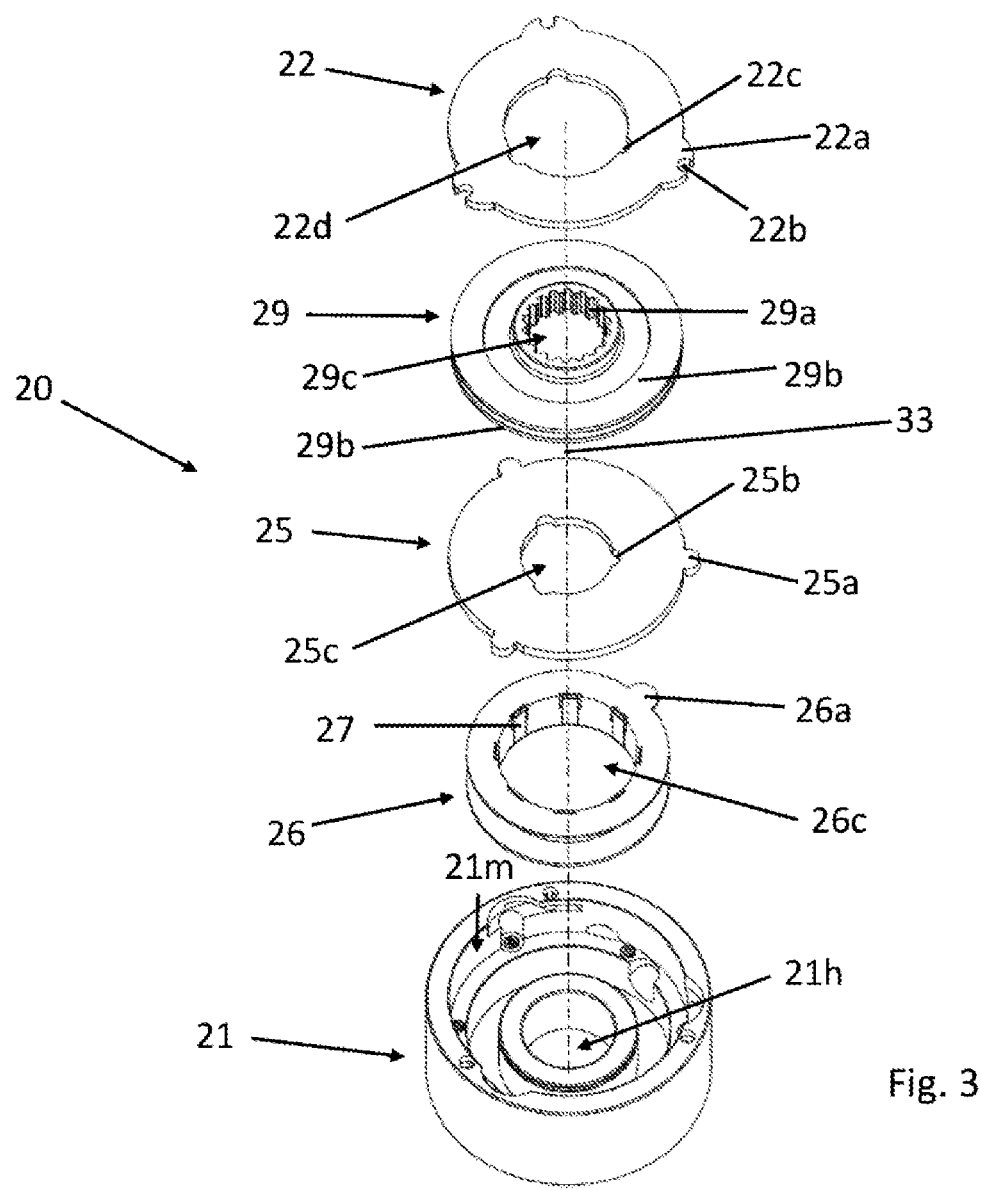
Figure 4A:
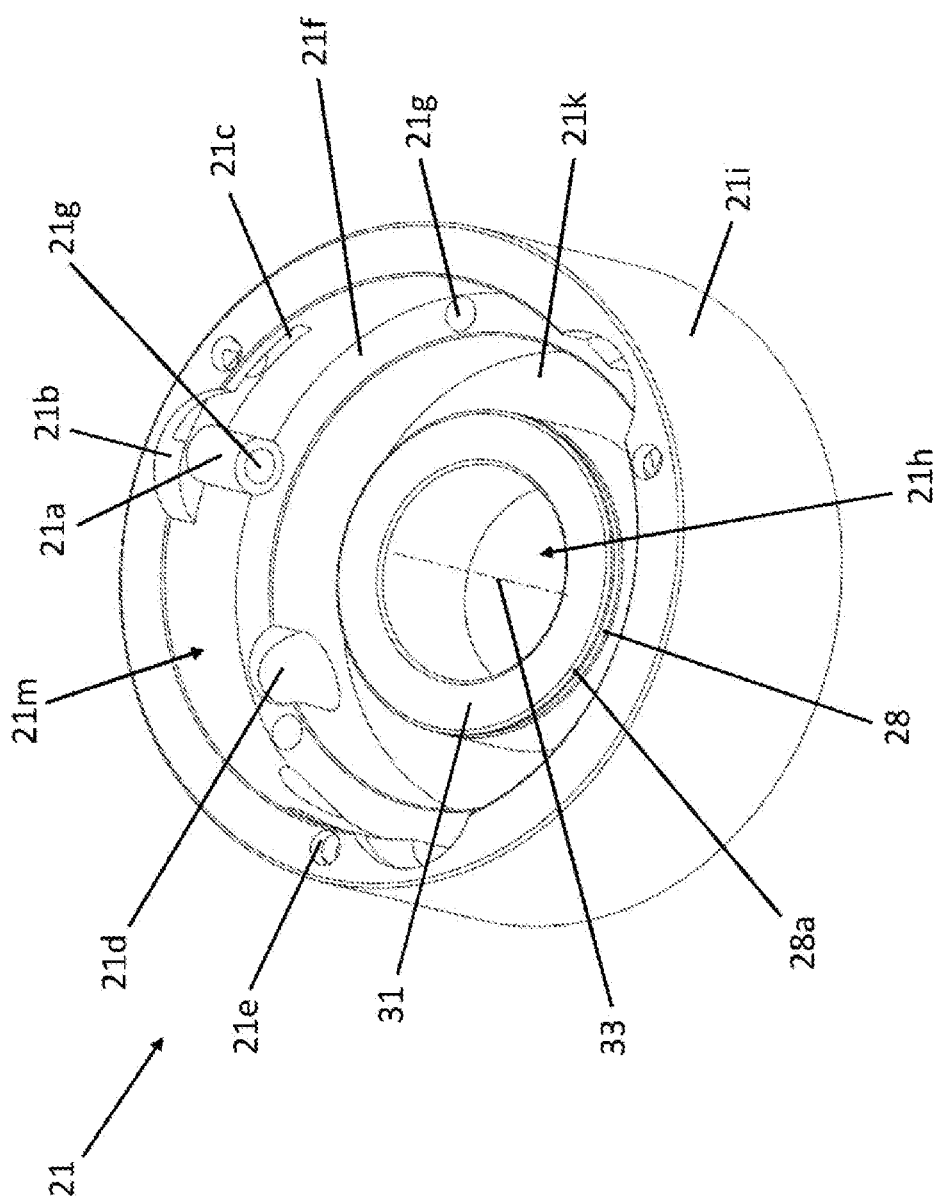
Figure 5:
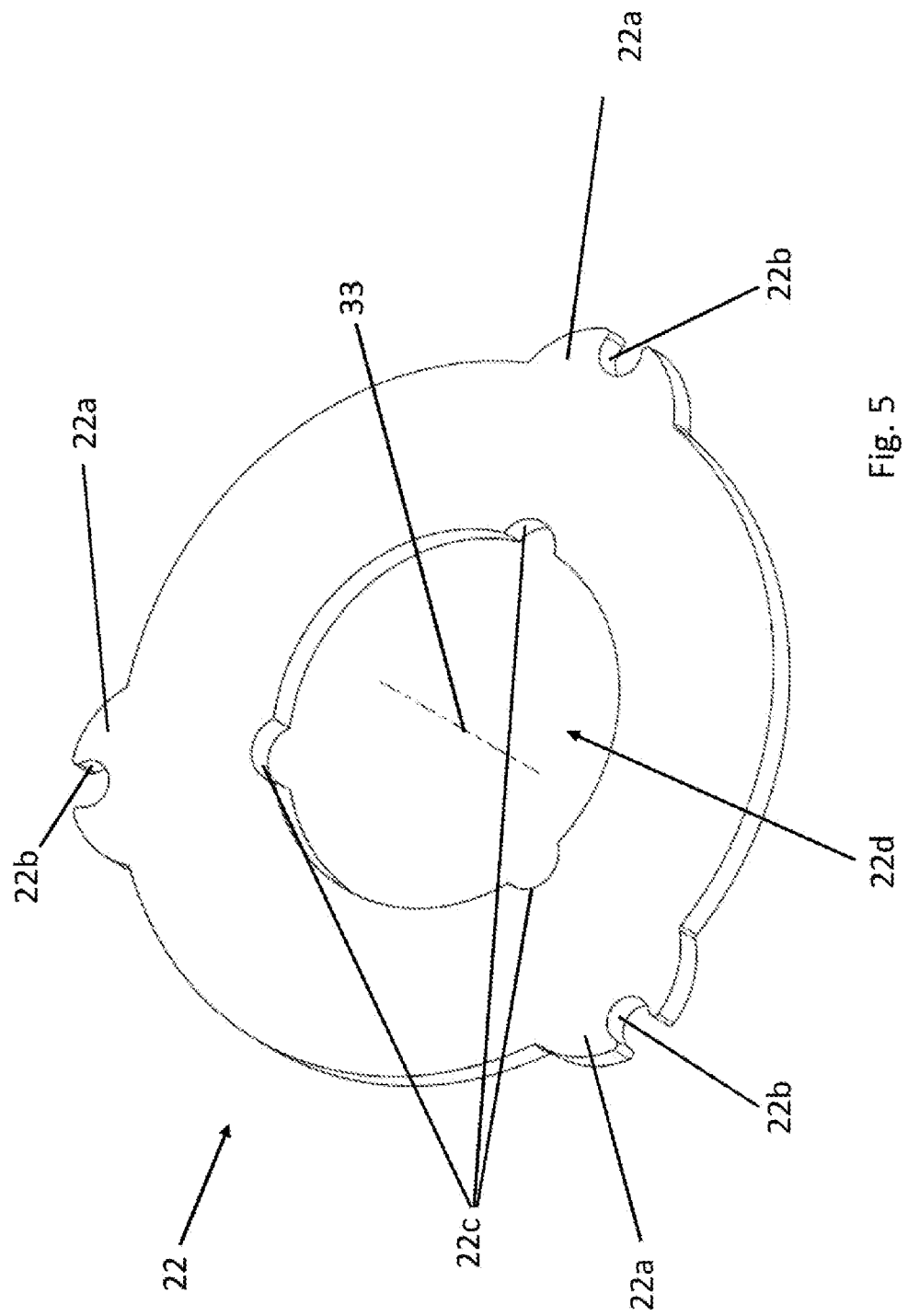
Figure 6:
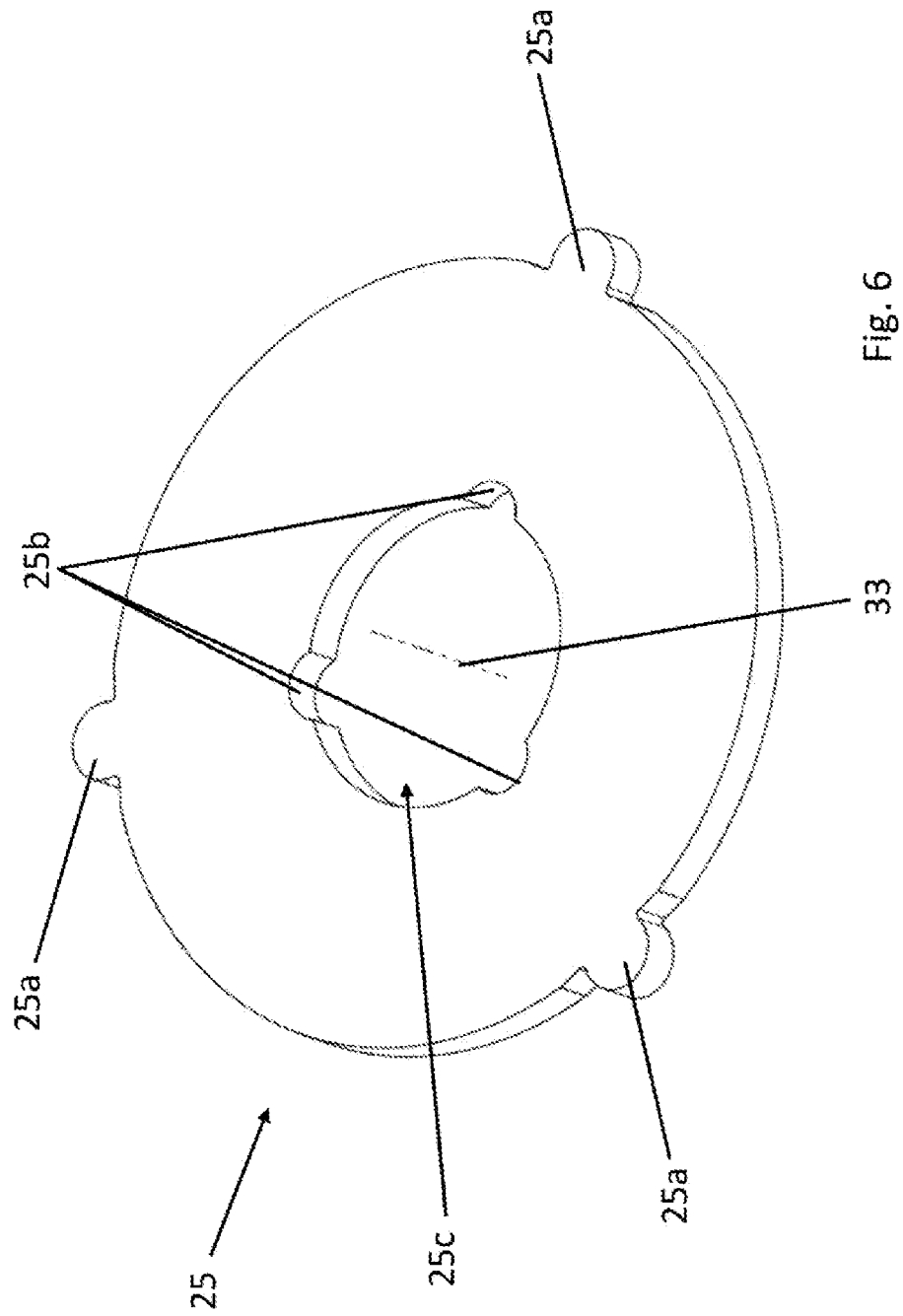
Figure 7:
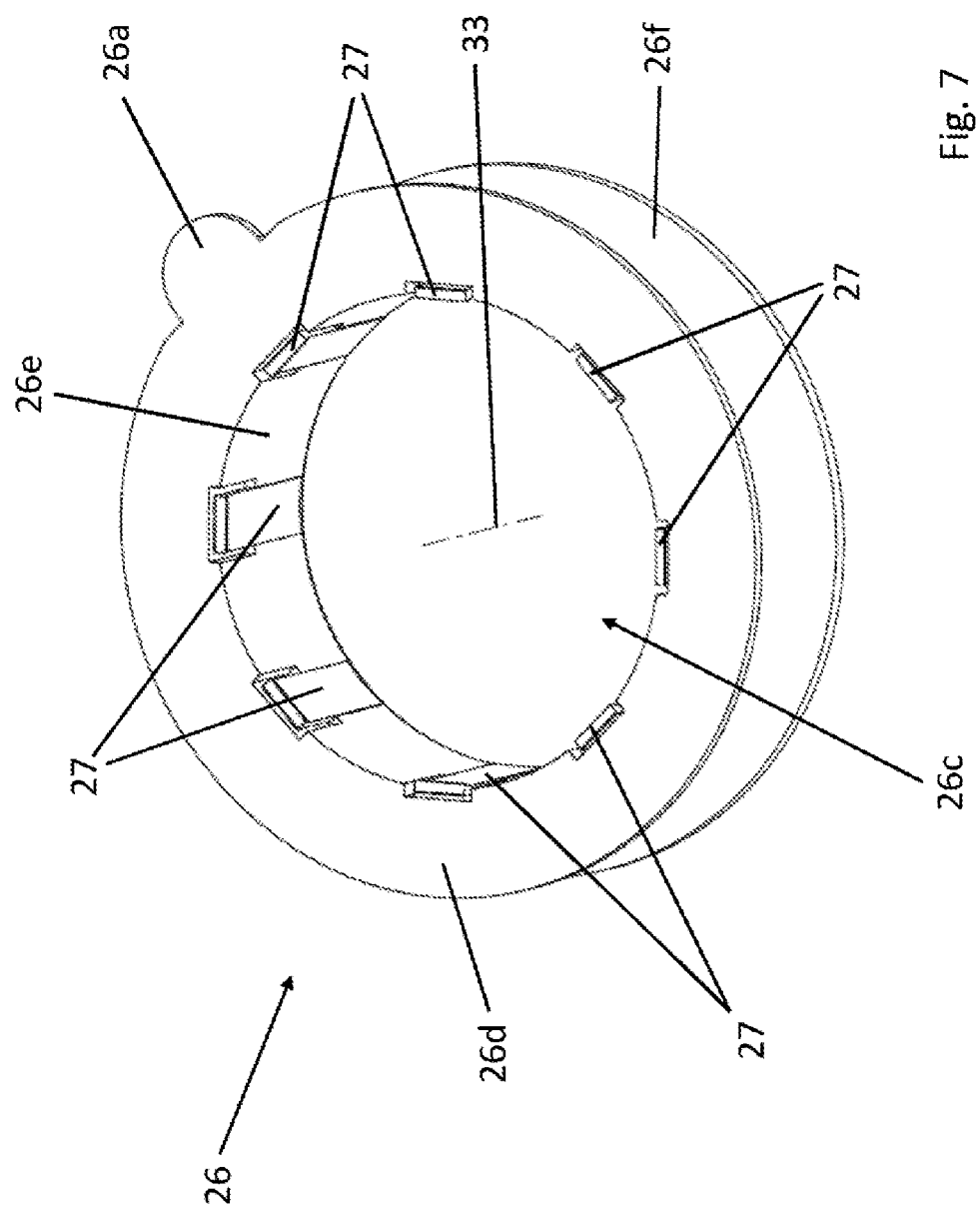

The invention is explained below with reference to drawings. The following are shown:

FIG. 1 shows a perspective view of a crane,

FIG. 2 shows a schematic sectional representation of an embodiment of the electromagnetic brake according to the invention, FIG. 3 shows a schematic exploded view of the electromagnetic brake according to the invention according to the embodiment in FIG. 2, FIG. 4a shows a schematic perspective view of a housing body according to the embodiment in FIG. 2, FIG. 4b shows a schematic perspective view of a further embodiment of the housing body, FIG. 5 shows a schematic perspectival view of a friction disk according to the embodiment in FIG. 2, FIG. 6 shows a schematic perspectival view of an armature disk according to the embodiment in FIG. 2, FIG. 7 shows a schematic perspectival view of a coil unit according to the embodiment in FIG. 2, FIGS. 8a, 8b, and 9 show schematic sectional representations of the electromagnetic brake according to the invention according to the embodiment in FIG. 2, FIGS. 10, 11, and 12 show a schematic perspective representation of the electromagnetic brake according to the invention according to the embodiment in FIG. 2 in various states of assembly.

FIG. 1 shows an exemplary structure for a crane 1 in a perspective view. Manifestly, the crane 1 is embodied as a traveling crane in the form of a single-carrier bridge crane which has a crane girder 2 mounted displaceably along a crane track (not shown). The crane girder 2 can be moved, driven by a motor—in particular, by an electric motor—in a substantially horizontal direction of travel F transverse to its longitudinal direction x. For this purpose, a chassis 5, 6 driven by an electric motor, for example, is arranged on the opposite ends 3, 4 of the crane girder 2 in each case, which are supported in each case on a crane rail of the crane track, which is not shown in greater detail here. On the crane girder 2, a crane trolley 7 with a hoist embodied, for example, as a cable pull is arranged which, together with the hoist and its lifting gear h, likewise driven by a motor or electric motor, can be moved, driven by a motor—in particular, an electric motor—along the crane girder 2 in parallel to the longitudinal direction x of the crane girder 2. The operation of the crane 1, i.e., in particular, the control of movements and functions of the chassis 5, 6, the crane trolley 7 and the respective drive thereof, and the lifting gear h, takes place via a control switch 8, which in the present case is designed as a wired pendant control switch. The control switch 8 is communicatively connected to the control unit 9.

The crane 1 serves to raise and lower loads (not shown) by means of the lifting gear h at different locations and to horizontally move loads in the direction of travel F by means of the chassis 5, 6 and/or, in the longitudinal direction x, by means of the crane trolley 7 within the working area thereof. The lifting gear h comprises an electromagnetic brake 20 according to the invention (see, for example, FIG. 2). In this application, the electromagnetic brake 20 can be used, for example, for holding a load or for decelerating a drive provided for raising and lowering a load. For this purpose, a brake disk 29 of the electromagnetic brake 20 is connected to a drive shaft of the lifting gear drive or to a shaft of a cable drum of the lifting gear h.

However, such a lifting gear h with an electromagnetic brake 20 according to the invention may also be installed on other types of crane or another, e.g., stationary, hoist.

FIG. 2 shows a schematic sectional illustration of an embodiment of the electromagnetic brake 20 according to the invention. Apart from a housing body 21 and a friction disk 22, the electromagnetic brake 20 comprises a coil unit 26, a pole core 31 which is arranged within the coil unit 26 and can be excited thereby, at least one compression spring 30, an armature disk 25, and a brake disk 29. The friction disk 22, the coil unit 26, the pole core 31, the compression spring 30, the armature disk 25, and the brake disk 29 are arranged in the housing body 21 in the state of assembly shown.

The annular friction disk 22 is positively connected to the housing body 21 via a bayonet-type connection 23. For this purpose, the friction disk 22 has three lugs 22a mounted in the receiving grooves 21c which are introduced into the housing body 21 and extend around sections of the circumference. For this purpose, the lugs 22a were aligned congruently with the recesses 21b of the housing body 21, axially moved into the recesses 21b and rotated by a subsequent relative movement in the direction of rotation, and thus guided into the receiving grooves 21c adjoining the recesses 21b, and, for example, the friction disk 22 was rotated in a clockwise direction or the housing body 21 rotated counterclockwise.

The friction disk 22 is secured against rotation relative to the housing body 21—in particular, during operation of the electromagnetic brake 20—by means of three locking elements 100. This makes it possible to prevent the friction disk 22 from rotating after its positioning, which is done during assembly, and thereby prevent the lugs 22a from moving out of the receiving grooves 21c in the direction of the recesses 21b in such a way that an unintentional release of the bayonet-like connection 23 between the friction disk 22 and the housing body 21 is possible. The locking elements 100 are connecting elements which are used to attach the electromagnetic brake 20 to a component—in particular, for flange mounting on a motor or a cable drum of a lifting gear h. The locking element 100 shown by way of example is a screw.

The locking element 100 in each case is guided through a through-hole 21e in a casing wall 21i of the housing body 21 and through a recess 22b in the associated lug 22a of the friction disk 22. A thread is not introduced into the through-holes 21e or into the recesses 22b, so that a purely positive connection is produced between the locking element 100 and the friction disk 22, and between the locking element 100 and the housing body 21.

The number of locking elements 100, and thus the recesses 22b in the lugs 22a of the friction disk 22, can also be less than the number of lugs 22a. If, optionally, more connecting elements are required to attach the electromagnetic brake 20 to a component than to secure the friction disk 22 against rotation, the other connecting elements can be guided through the electromagnetic brake 20 or fastened to the electromagnetic brake 20 at other positions which are independent of the friction disk 22 or their lugs 22a.

The axially-displaceable armature disk 25 is arranged above the coil unit 26. The armature disk 25 has, by way of example, three guide lugs 25a which serve to axially guide the armature disk 25 in the guide grooves 21a provided internally for this purpose in the casing wall 21i of the housing body 21. A groove-lug connection 32 thus exists between the armature disk 25 and the housing body 21.

The brake disk 29 is arranged between the armature disk 25 and the friction disk 22, and is configured to be rotatable and axially displaceable. The brake disk 29 has an internal sprocket 29a by means of which the brake disk 29 can be connected to a drive shaft (not shown) to be braked by the electromagnetic brake 20.

The at least one compression spring 30 is arranged and configured such that, by means of its compressive force, the armature disk 25 is axially displaceable towards the brake disk 29. In the embodiment shown, six compression springs 30 are arranged uniformly over the circumference of the electromagnetic brake 20 in the casing wall 21i of the housing body 21. However, it is also conceivable for a different number of compression springs 30 to be distributed—preferably, uniformly—over the circumference of the electromagnetic brake 20. Alternatively, a single compression spring 30 may also be arranged such that it partially or completely surrounds the pole core 31.

The coil unit 26 and the pole core 31 are arranged and configured such that a tensile force can be generated by the pole core 31, which is electromagnetically excited by means of the coil unit 26, by means of which tensile force the armature disk 25 is axially displaceable away from the brake disk 29, counter to the spring force of the compression spring(s) 30.

In a first operating state of the electromagnetic brake 20—the braking—the armature disk 25 presses the brake disk 29 against the friction disk 22 by means of the compressive force of the six compression springs 30 in order to brake the brake disk 29 by means of the braking torque produced between the brake disk 29 and the friction disk 22 and/or between the brake disk 29 and the armature disk 25. In the region of its outer diameter, the brake disk 29 has one or more brake pads 29b on both opposite sides (see FIGS. 8a and 8b). The friction disk 22 and/or the armature disk 25 preferably has/have a suitably structured surface on the side respectively directed towards the brake disk 29 in order to ensure an optimal deceleration of the brake disk 29 during braking.

In a second operating state of the electromagnetic brake 20—the release—the armature disk 25 is arranged at a distance from the brake disk 29 by means of a tensile force generated by the coil unit 26 and the pole core 31, which is greater than the compressive force of the six compression springs 30, such that a free and thus unbraked rotation of the brake disk 29 is made possible. In the second operating state, the armature disk 25 can rest on a shoulder 21f (see, for example, FIG. 4a) of the casing wall 21i of the housing body 21 and support it on the latter with sufficient tensile force.

During braking, the friction disk 22, by means of the compressive force generated by the compression spring(s) 30, is pressed via the armature disk 25 and the brake disk 29 onto an outer web of the receiving groove 21c. The outer web of the receiving groove 21c delimits a first opening 21m (see, for example, FIG. 3), opposite the base 21k of the housing body 21, of the housing body 21. During the release, the friction disk 22 is pulled by means of the magnetic field generated by the coil unit 26 and the pole core 31, or by the resulting tensile force, onto the inner web of the receiving groove 21c in the direction of the base 21k.

In spite of a purely positive, bayonet-type connection 23 between the housing body 21 and the friction disk 22 produced during the mounting of the electromagnetic brake 20, the friction disk 22 is thus pulled or pressed, during operation, by the acting forces against one of the webs delimiting the receiving groove 21c. Vibrations on the friction disk 22 and thus noise generation during the operation of the electromagnetic brake 20 can thus be reduced or even avoided.

FIG. 3 shows a schematic exploded view of the electromagnetic brake 20 according to the invention according to the embodiment in FIG. 2. The design of the electromagnetic brake 20 or the arrangement of the associated components—housing body 21, coil unit 26, armature disk 25, brake disk 29, and friction disk 22—relative to one another in the axial direction of the electromagnetic brake 20 can be clearly seen. Said components are aligned for mounting on the central axis 33 so that the holes 21h, 22d, 25c, 26c, 29c are concentrically aligned in all components in order to be able to mount a drive shaft, for example. Subsequently, the components mentioned are arranged concentrically in the housing body 21 in relation to the central axis 33, wherein they are aligned in their respective plane in such a way that the respective lug 22a, guide lug 25a, and positioning lug 26a can be inserted into the corresponding recess 21b, guide groove 21a, and/or receptacle 21d of the housing body 21.

Furthermore, the statements relating to FIG. 2 also apply analogously to the illustration shown in FIG. 3.

FIG. 4a shows a schematic perspective illustration of the housing body 21 according to the embodiment in FIG. 2. The housing body 21 has a substantially hollow-cylindrical and annular shape, with a circular base area. The housing body 21 is here formed in one piece.

The housing body 21 has a first opening 21m on its front face opposite the base 21k. The bottom 21k has a smaller second opening 21h compared to the first opening 21m. The aforementioned drive shaft (not shown) to be braked can, for example, be guided through the second opening 21h. The housing body 21 also has special form details which are required for the mounting and functioning of the electromagnetic brake 20. Said form details will be discussed in the following description.

The first opening 21m extends up to the casing wall 21i and is delimited by the latter. In the region of the first opening 21m, the housing body 21 in the casing wall 21i has three recesses 21b with receiving grooves 21c adjoining thereto. The recesses 21b are arranged on a web, formed by the casing wall 21i and delimiting the receiving grooves 21c, on the front face of the housing body 21. The receiving grooves 21c extend in sections circumferentially and spaced apart from one another in the casing wall 21i of the housing body 21. Said arrangement of the receiving grooves 21c extending in sections has the advantage that the end-mounted position of the friction disk 22 in the housing body 21 can be predetermined in a simple manner by the end, facing away from the recess 21b, of the receiving groove 21c, and the subsequent assembly steps can thus be simplified. The recesses 21b enable the friction disk 22 to be inserted into the receiving grooves 21c, and thus the positive bayonet-type connection 23 between the housing body 21 and the friction disk 22 to be produced.

The guide grooves 21a for guiding the armature disk 25 are arranged such that the guide lugs 25a of the armature disk 25 can be inserted through the respective recess 21b into the guide grooves 21a. The anchor disk 25 can be mounted on the shoulder 21f of the casing wall 21i of the housing body 21, which connects the base 21k to the casing wall 21i.

The pole core 31 is annular and arranged in the housing body 21—in particular, embedded in the wall thereof or formed therefrom. The pole core 31 surrounding the opening 21h in the base 21k is spaced apart from the casing wall 21i or from the shoulder 21f of the housing body 21 in such a way that the coil unit 26 can be arranged therebetween. The pole core 31 and the housing body 21 share the same central axis 33. In the embodiment shown, the pole core 31 is part of the housing body 21. Since the pole core 31 has to be made of a magnetic material, in this exemplary embodiment, the entire housing body 21 is made of a magnetic material. A circumferential groove 28 is arranged on the outer diameter of the pole core 31, in which circumferential groove the snap hooks 27 of the coil unit 26 can engage and be mounted. When a force occurs in the direction of the first opening 21m, the snap hooks 27 are then supported in parallel to the central axis 33 on a web 28a delimiting the groove 28.

In addition, the housing body 21 has in its casing wall 21i or in the shoulder 21f a receptacle 21d into which a positioning lug 26a of the coil unit 26 is inserted, in order to secure the coil unit 26 against rotation relative to the housing body 21.

Several blind-holes 21g in the shoulder 21f serve to receive the compression springs 30. Said compression springs are distributed uniformly on the circumference of the shoulder 21f. In the present exemplary embodiment, there are six blind-holes 21g, such that all six compression springs 30 can be installed.

Several through-holes 21e, which extend in parallel to the central axis 33 through the casing wall 21i of the housing body 21, serve to feed the locking elements 100 through. The through-holes 21e also extend in each case through the receiving groove 21c, which serves to receive the friction disk 22. The through-holes 21e do not have a thread.

FIG. 4b shows a schematic perspective view of a further embodiment of the housing body 21. This embodiment differs from the embodiment shown in FIG. 4a in that only a single receiving groove 21c is introduced circumferentially over the entire circumference in the housing body 21 or casing wall 21i thereof, and, instead of a single circumferential groove 28 or a circumferential web 28a for supporting the snap hooks 27, several thereof are introduced in sections circumferentially and spaced apart from one another.

However, embodiments are also conceivable in which only one single receiving groove 21c and one single groove 28, each over the entire circumference, are provided circumferentially, or both the receiving grooves 21c and the grooves 28 are each introduced only in sections circumferentially and spaced apart from one another. Furthermore, the statements relating to FIG. 4a also apply analogously to the illustration shown in FIG. 4b.

FIG. 5 shows a schematic perspective view of a friction disk 22 according to the embodiment in FIG. 2. The friction disk 22 is rotationally symmetrical and comprises three, approximately semicircular, outwardly-directed lugs 22a which are each arranged at an angle of 120° on the circumference of the friction disk 22. The number of lugs 22a can be varied, but should be at least two so that a lifting of the friction disk 22 out of the housing body 21 can be avoided. In addition, it is advantageous if the lugs 22a are distributed uniformly on the circumference of the friction disk 22. In each of the lugs 22a, a recess 22b is arranged through which the locking elements 100 are inserted during attachment of the electromagnetic brake 20 to another component, in order to prevent rotation of the friction disk 22 about the central axis 33. It is also conceivable that a recess 22b not be introduced in each lug 22a.

The friction disk 22 has a hole in its center, which hole is dimensioned such that the drive shaft (not shown) to be braked can be guided through. The recesses 22c at the inner diameter of the friction disk 22 serve the improved flow of force in the friction disk 22 as well as a positionally-accurate gripping of the friction disk 22, e.g., by means of a robot gripper, and a precise positioning of the friction disk 22 in the housing body 21, even with narrow tolerances. The surface of the friction disk 22 is designed, accordingly, for optimal deceleration at least on the side which is provided for brake contact with the brake disk 29.

FIG. 6 shows a schematic perspective view of the armature disk 25 according to the embodiment in FIG. 2. The armature disk 25 is rotationally symmetrical and comprises three, approximately semicircular, outwardly-directed guide lugs 25a which are each arranged at an angle of 120° on the circumference of the armature disk 25. The three guide lugs 25a allow the armature disk 25 to be guided without tilting in the housing body 21.

The armature disk 25 has a hole 25c in its center, which hole 25c is dimensioned such that the drive shaft (not shown) to be braked can be guided through. The recesses 25b at the inner diameter of the armature disk 25 serve the improved flow of force in the armature disk 25 as well as a positionally-accurate gripping of the armature disk 25, e.g., by means of a robot gripper, and a precise positioning of the armature disk 25 in the housing body 21, even with narrow tolerances. The surface of the armature disk 25 is designed, accordingly, for optimal deceleration at least on the side which is directed towards the brake disk 29.

FIG. 7 shows a schematic perspective view of a coil unit 26 according to the embodiment in FIG. 2. The coil unit 26 has a substantially annular geometry with an outwardly-open, C-shaped cross-section. The C-shaped cross-section is formed by a substantially horizontally-extending upper limb 26d, a substantially horizontally-extending lower limb 26f, and a web 26e connecting the two limbs 26d, 26f and extending substantially at right angles to the limbs 26d, 26f.

In this embodiment, the coil unit 26 has eight snap hooks 27. However, the number of snap hooks 27 can be varied, taking into account the forces occurring in both axial directions. Each snap hook 27 is dimensioned and designed, in terms of material technology, in such a way that, during the mounting of the coil unit 26 in the housing body 21, by applying a force which acts in parallel with the central axis 33 in the direction of the base 21k of the housing body 21, said snap hook can elastically deform outwards in such a way that the snap hook 27 can latch into the groove 28. The snap hooks 27 are an integral component of the coil unit 26. However, it is also conceivable for the snap hooks 27 to be separate components and connected to the coil unit 26.

The coil unit 26 also has one, approximately semicircular, positioning lug 26a, which serves to secure against rotation in the housing body 21. In addition, the positioning lug 26a in housing bodies 21, in which several grooves 28 are present in sections, can serve such that, in each case, a snap hook 27 is positioned congruently with one of the grooves 28 during the assembly of the coil unit 26.

The coil unit 26 is designed as a coil carrier and is suitable for receiving one or more coils (not shown) necessary for generating a magnetic field. The coils are arranged or mounted in the outwardly-open, C-shaped structure of the coil unit 26.

Figure 8A:
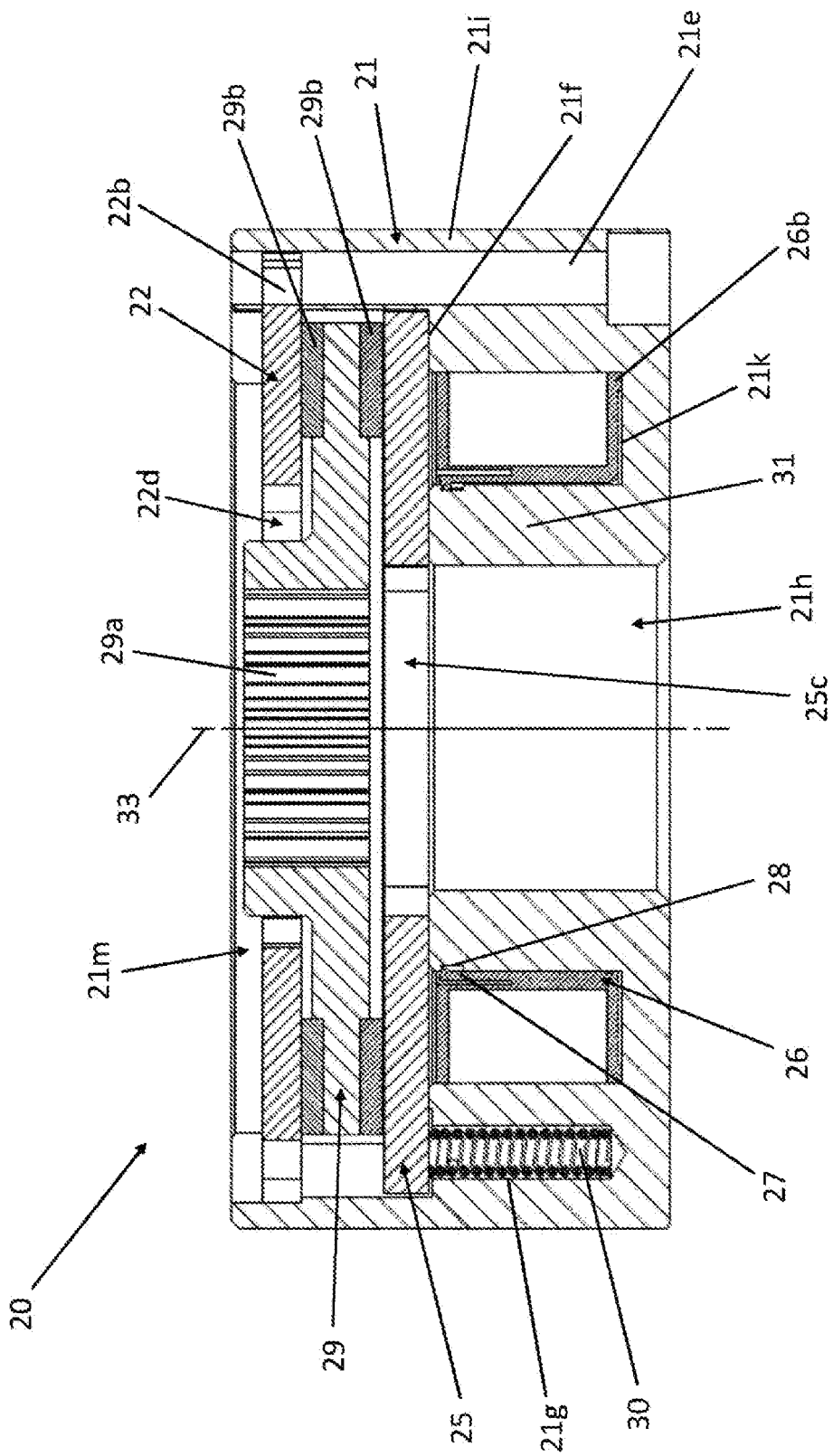
Figure 8B:
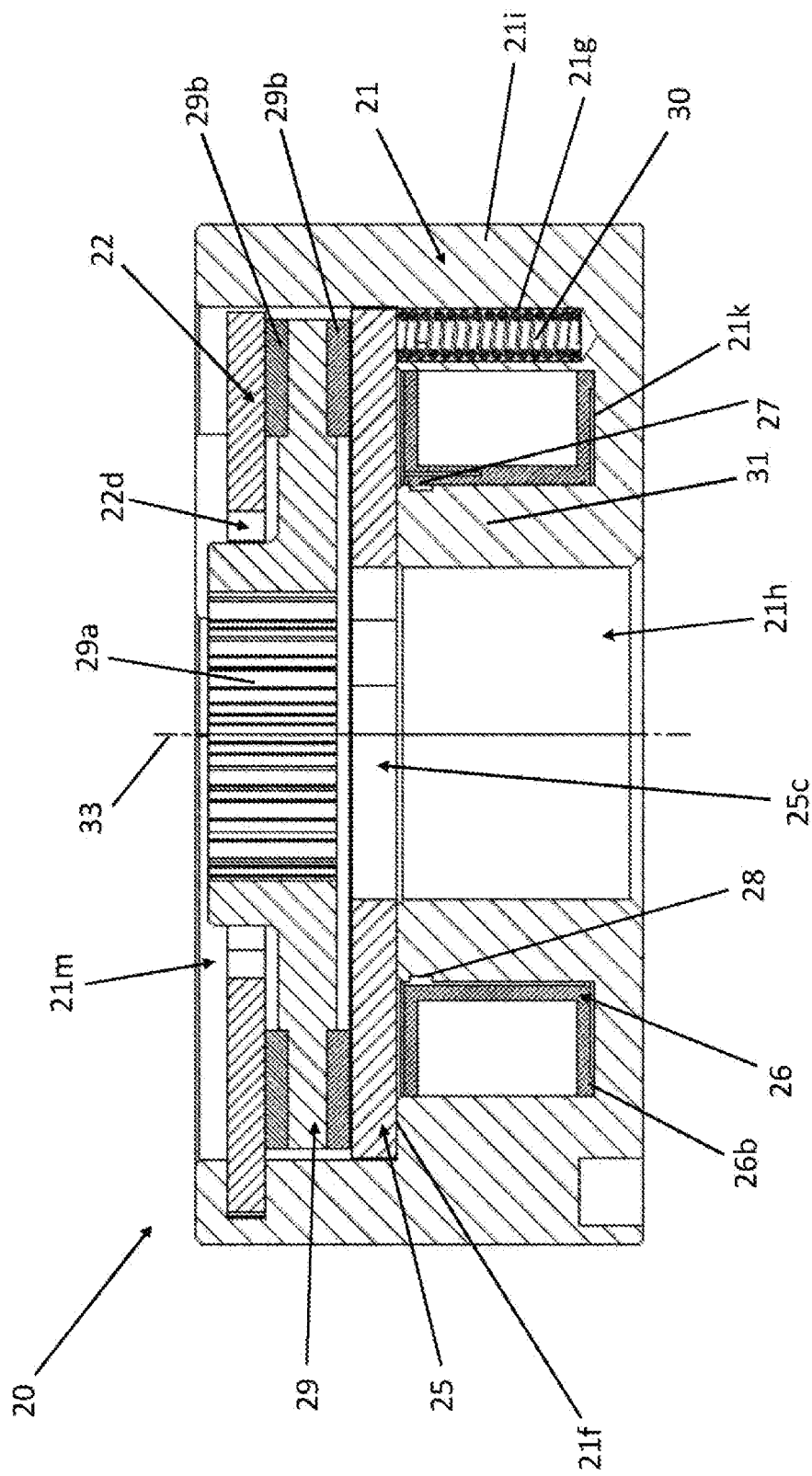
Figure 9:
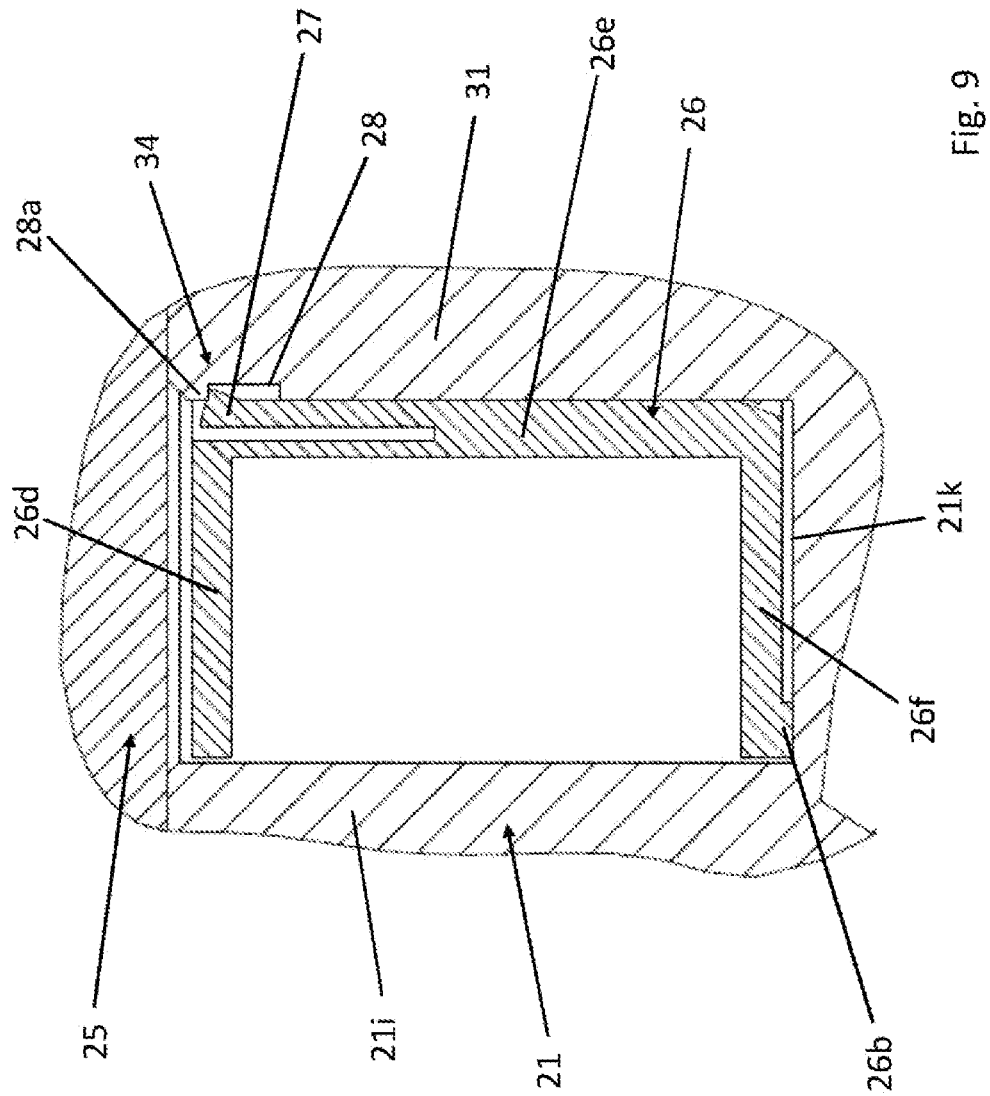

FIGS. 8a, 8b, and 9 show schematic sectional representations of the electromagnetic brake 20 according to the invention according to the embodiment in FIG. 2. The structure of the mounted electromagnetic brake 20 can be clearly seen in FIGS. 8a and 8b.

The housing body 21 has, between its casing wall 21i and the pole core 31, a recess dimensioned according to the dimensions of the coil unit 26. The recess is designed in such a way that, during the assembly of the coil unit 26, a play required therefor is present, and, nevertheless, sufficient fixation of the coil unit 26—in particular, during the operation of the electromagnetic brake 20—is ensured. The snap hooks 27 of the coil unit 26 are mounted in the groove 28 and are supported on the web 28a of the housing body 21 (see FIG. 9). The coil unit 26 is thus exclusively positively connected to the housing body 21.

The armature disk 25 is arranged between the first opening 21m of the housing body 21 and the coil unit 26. So that the armature disk 25 can rest on the shoulder 21f, the upper limb 26d of the coil unit 26 directed towards the first opening 21m of the housing body 21 is correspondingly spaced apart from the shoulder 21f. The tensile force can be generated by means of the pole core 31 excited by the coil unit 26, by means of which tensile force the armature disk 25 is axially displaceable away from the brake disk 29 for releasing the brake 20.

The six compression springs 30 are each arranged in the blind-holes 21g. FIGS. 8a and 8b each show only one blind-hole 21g and one compression spring 30 thereof. The compression springs 30 are configured, by means of their compressive force, to axially displace the armature disk 25 towards the brake disk 29 for braking.

The friction disk 22 is arranged between the front face of the housing body 21 and the brake disk 29. The brake disk 29 arranged between the axially-displaceable armature disk 25 and the friction disk 22 is configured so as to be rotatable about the central axis 33 and axially displaceable. In the region of its outer diameter, the brake disk 29 has one or more brake pads 29b on both opposite sides. In this way, optimal braking can be achieved—in particular, in combination with the aforementioned surfaces on the friction disk 22 and/or the armature disk 25.

In FIG. 9, the region from FIGS. 8a and 8b is shown enlarged, from which the installation situation of the coil unit 26 in the housing body 21 and of the C-shaped cross-section formed by the limbs 26d, 26f and the web 26e can be clearly seen, which C-shaped cross-section is open outwardly towards the casing wall 21i.

Like the other snap hooks 27, the snap hook 27 shown is an integral component of the coil unit 26, engages in the groove 28, and supports the coil unit 26 on the web 28a on the housing body 21. The coil unit 26 is thus positively connected to the housing body 21 by means of a snap connection 34.

To produce the snap connection 34, the snap hook 27 is elastically deformed in the direction of the casing wall 21i of the housing body 21. In other words, during the mounting of the coil unit 26, the snap hooks 27 are bent back radially outwards in order then to latch radially inwards into the groove 28 of the housing body 21. For this purpose, the coil unit 26 has a slot-shaped recess extending along the web 26e in the region of the snap hooks 27. The elastic deformation takes place due to a force which, in particular, acts in parallel to the central axis 33 in the direction of the base 21k of the housing body 21.

The coil unit 26 is mounted on a shoulder 26b on the base 21k of the housing body 21. The shoulder 26b creates a space between the coil unit 26 and the housing body 21 in the region of the diameter on which the snap hooks 27 are arranged. As a result, the coil unit 26 is axially movable, relative to the housing body 21, in the region of the snap connection 34 in order to simplify assembly. The space can thus be used as a type of spring travel to press the limb 26f, facing the base 21k, of the coil unit 26, during its mounting outside the shoulder 26b about the shoulder 26b serving as a pivot point, in the direction of the base 21k of the housing body 21, and thus to bend in this direction so that the snap hooks 27 can more easily latch into the groove 28 of the housing body 21. In other words, the coil unit 26 is designed to be flexible or resilient so that a latching of the snap hooks 27 is ensured even in the case of manufacturing inaccuracies.

Figure 10:
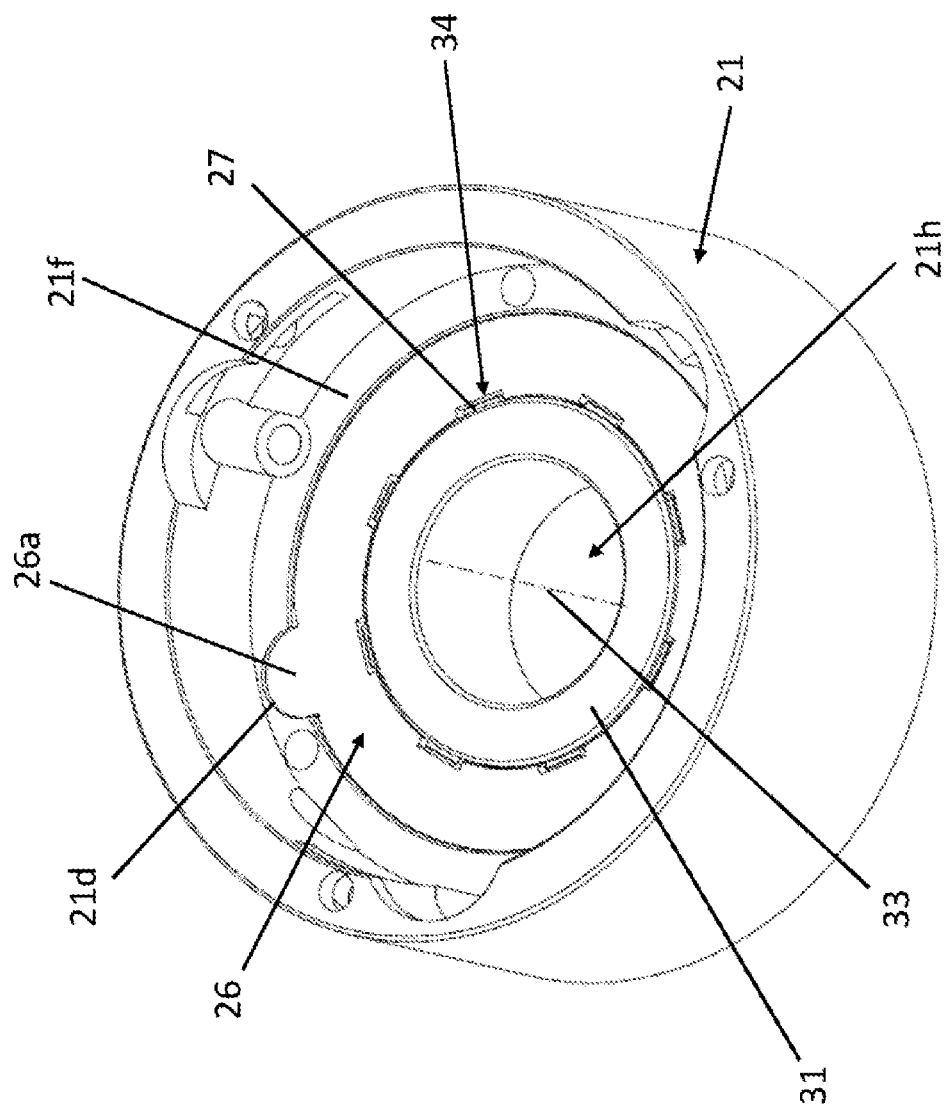
Figure 11:
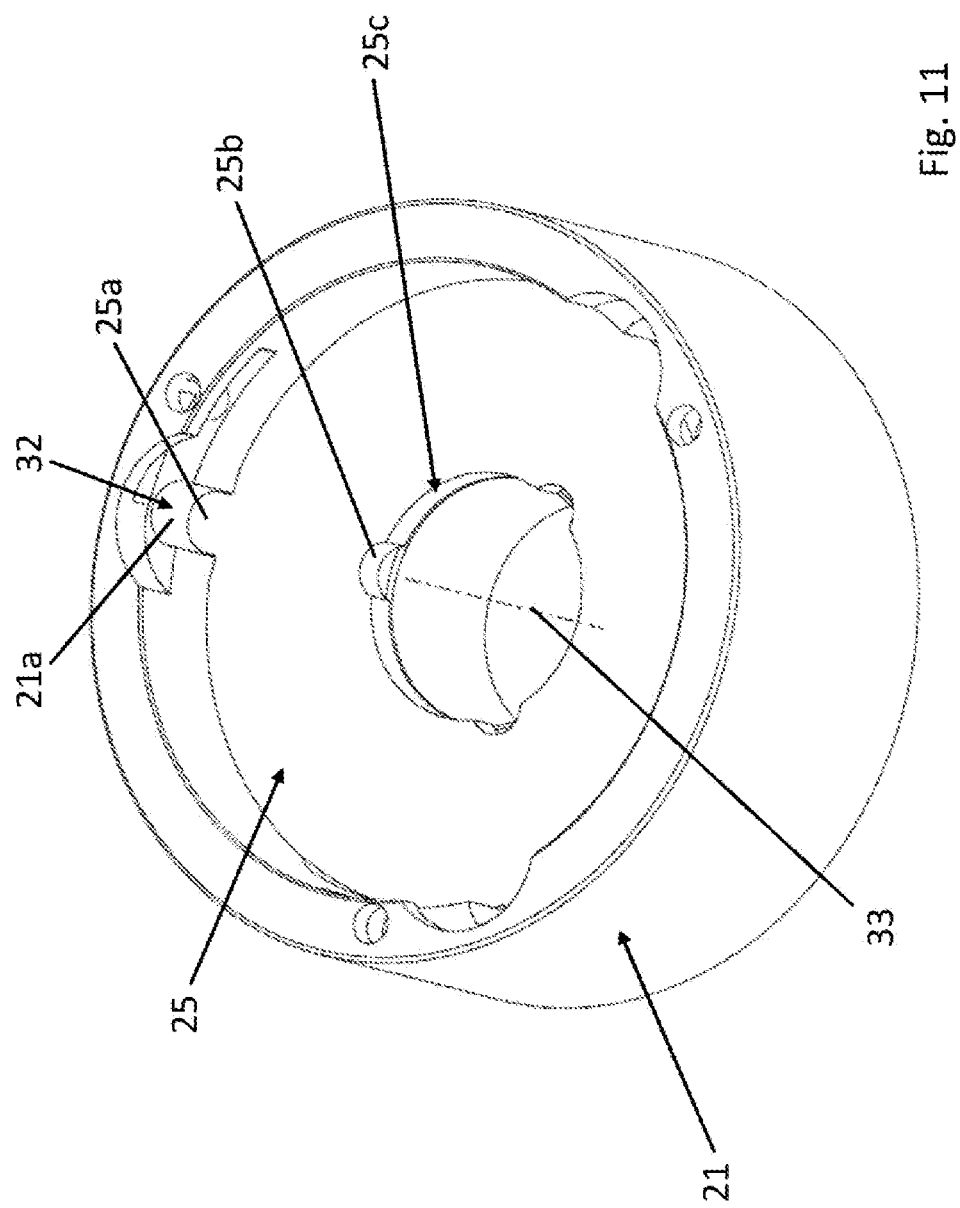
Figure 12:
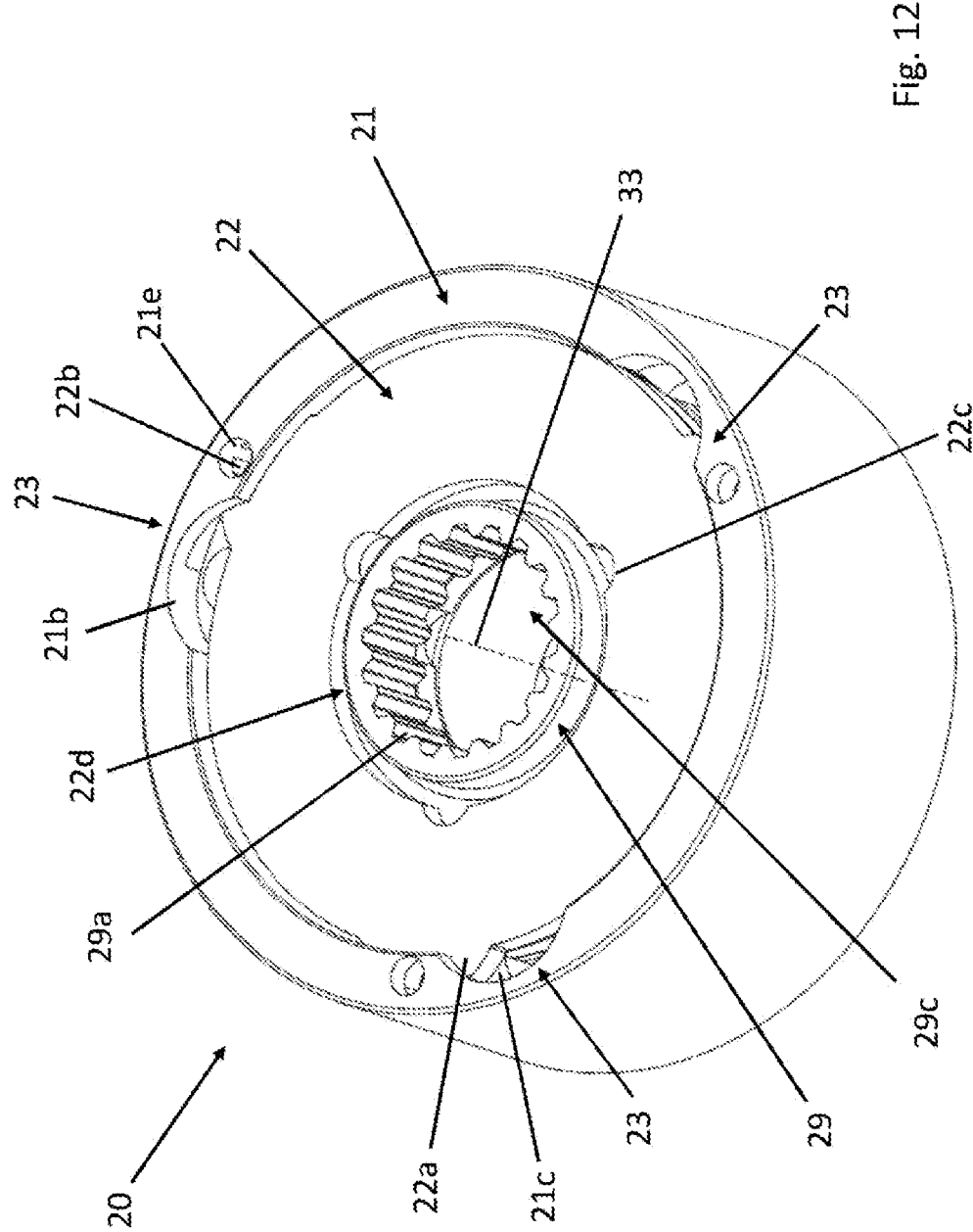

FIGS. 10, 11, and 12 show schematic perspective representations of the electromagnetic brake 20 according to the invention according to the embodiment in FIG. 2 in various states of assembly.

In FIG. 10, only the coil unit 26 is shown installed in the housing body 21. To prevent rotation of the coil unit 26, the positioning lug 26a arranged thereon engages in the corresponding receptacle 21d on the housing body 21. A purely positive snap connection 34 is thus produced between the coil unit 26 and the housing body.

FIG. 11 additionally shows the armature disk 25 in the housing body 21. The armature disk 25 is inserted into the housing body 21 in such a way that each guide lug 25a of the armature disk 25 is guided in an associated guide groove 21a of the housing body 21. The armature disk 25 is guided axially in the housing body 21 exclusively via the groove-lug connection 32 thus formed. The outer contour of the guide lugs 25a is preferably designed to correspond to the inner contour of the guide grooves 21a. However, sufficient play for an axial movement of the armature disk 25 is provided between the outer contour of the guide lugs 25a and the inner contour of the guide grooves 21a.

In FIG. 12, the brake disk 29 and the friction disk 22 are additionally shown installed in the housing body 21. The friction disk 22 is positively connected to the housing body 21. For the bayonet-type connection 23, the lugs 22a of the friction disk 22 are guided through the recesses 21b into the receiving grooves 21c of the housing body 21 and are displaced in said receiving grooves in the direction of rotation. The friction disk 22 and the housing body 21 are thus rotated relative to one another about the central axis 33. After this relative movement, the three lugs 22a of the friction disk 22 and the recess 21b are no longer axially congruent, i.e., substantially parallel to the central axis 33.

The three connecting elements, which in this case simultaneously all also serve as locking elements 100, can then be guided, during attachment of the electromagnetic brake 20 to another component, through the through-holes 21e and the correspondingly-positioned recesses 22b on the lugs 22a of the friction disk 22.

LIST OF REFERENCE SIGNS

1 Crane
2 Crane girder
3 End
4 End
5 Chassis
6 Chassis
7 Crane trolley
8 Control switch
9 Control unit
20 Electromagnetic brake
21 Housing body
21a Guide groove
21b Recess
21c Receiving groove
21d Receptacle
21e Through-hole
21f Shoulder
21g Blind-hole
21h Second opening
21i Casing wall
21k Base
21m First opening
22 Friction disk
22a Lug
22b Recess
22c Recess
22d Hole
23 Bayonet-type connection
25 Armature disk
25a Guide lug
25b Recess
25c Hole
26 Coil unit
26a Positioning lug
26b Shoulder
26c Hole
26d Upper limb
26e Web
26f Lower limb
27 Snap hook
28 Groove
28a Web
29 Brake disk
29a Sprocket
29b Brake pad
29c Hole
30 Compression spring
31 Pole core
32 Groove-lug connection
33 Central axis
34 Snap-fit connection
100 Locking element
h Lifting gear
F Direction of travel
x Longitudinal direction

The invention claimed is:

1. An electromagnetic brake having a housing body, a friction disk, and at least one compression spring provided in the housing body, wherein the friction disk is configured to be connected to the housing body by a bayonet lock, wherein the friction disk is secured against rotation relative to the housing body, wherein the friction disk is secured against rotation relative to the housing body by at least one locking element, and the at least one locking element comprises a connecting element configured for attaching the electromagnetic brake to a component, wherein an armature disk is guided axially via a groove-lug connection in the housing body, wherein the groove-lug connection comprises at least one guide groove and at least one associated guide lug.

2. The electromagnetic brake according to claim 1, wherein the at least one guide groove is arranged in the housing body.

3. The electromagnetic brake according to claim 1, wherein a coil unit is provided which is positively connected to the housing body and/or is secured against rotation relative to the housing body.

4. The electromagnetic brake according to claim 3, wherein the coil unit is positively connected to the housing body by means of a snap-fit connection.

5. The electromagnetic brake according to claim 3, wherein the coil unit is mounted on the housing body such that the coil unit, in the region of the positive connection to the housing body, is axially movable relative thereto to simplify assembly.

6. A lifting gear having the electromagnetic brake according to claim 1.

7. A method for assembling an electromagnetic brake according to claim 1, comprising inserting the friction disk into a recess of the housing body and bringing the friction disk, into engagement with the housing body via a receiving groove adjoined to the recess by a relative movement in the direction of rotation, wherein at least one lug of the friction disk and the recess are no longer axially aligned after the relative movement, and the friction disk is subsequently secured against rotation relative to the housing body by the at least one locking element.

8. The method for assembling an electromagnetic brake according to claim 7, wherein the at least one guide lug is at the armature disk and the at least one associated guide groove is at the housing body, the method further comprising inserting the armature disk into the housing body such that the at least one guide lug of the armature disk is guided in the associated guide groove of the housing body.

9. The method for assembling an electromagnetic brake according to claim 7, further comprising inserting a coil unit into the housing body such that at least one positioning lug of the coil unit engages in a corresponding receptacle of the housing body to protect against rotation and/or snap-fit connecting the coil unit to the housing body by an axially positive connection.

10. The electromagnetic brake according to claim 1, wherein the groove-lug connection comprises three guide grooves and three associated guide lugs.

11. The electromagnetic brake according to claim 10, wherein the guide grooves are arranged in the housing body.

12. The electromagnetic brake according to claim 4, wherein at least one snap hook of the coil unit is supported on a web of the housing body.

13. A method for assembling an electromagnetic brake, said method comprising:
- inserting a friction disk into a recess of a housing body having at least one compression spring;
- connecting the friction disk to the housing body with a bayonet lock;
- securing the friction disk against rotation relative to the housing body with a locking element comprising a connecting element configured for attaching the electromagnetic brake to a component;
- bringing the friction disk into engagement with the housing body via a receiving groove adjoined to the recess by a relative movement in the direction of rotation, wherein at least one lug of the friction disk is no longer axially aligned with the recess after the relative movement; and
- securing the friction disk against rotation relative to the housing body by the locking element.

\* \* \* \* \*